United States Patent [19]
Craig et al.

[11] 3,842,423
[45] Oct. 15, 1974

[54] EXPOSURE CONTROL APPARATUS

[75] Inventors: Loren J. Craig, Springwater; William T. Hochreiter, Rochester, both of N.Y.

[73] Assignee: Eastman Kodak Company, Rochester, N.Y.

[22] Filed: Oct. 17, 1973

[21] Appl. No.: 407,375

[52] U.S. Cl..................... 354/29, 250/209, 354/31, 354/49, 354/59
[51] Int. Cl........................ G03b 7/14, G03b 7/20
[58] Field of Search.......... 250/209; 354/24, 27, 29, 354/30, 31, 48, 59, 60, 49, 51

[56] References Cited
UNITED STATES PATENTS

| | | | |
|---|---|---|---|
| 3,433,140 | 3/1969 | Wick et al. ............... | 354/29 |
| 3,439,595 | 4/1969 | Kiper ..................... | 354/29 |
| 3,464,332 | 9/1969 | Davison et al. ............ | 354/30 X |
| 3,474,713 | 10/1969 | Mori et al. .............. | 354/31 |
| 3,503,314 | 3/1970 | Tanabe ................... | 354/24 |
| 3,526,177 | 9/1970 | Kiper et al. .............. | 354/29 |
| 3,528,350 | 9/1970 | Schmitt .................. | 354/29 |
| 3,555,985 | 1/1971 | Ueda et al. ............... | 354/48 |
| 3,578,765 | 5/1971 | Kobayashi et al. ......... | 354/27 |
| 3,593,629 | 7/1971 | Rentschler ............... | 354/29 |
| 3,641,891 | 2/1972 | Burgarella ................ | 354/30 X |

*Primary Examiner*—Richard A. Wintercorn
*Attorney, Agent, or Firm*—John L. Palmer

[57] ABSTRACT

Exposure control apparatus having diaphragm blades mounted for movement to form an exposure aperture and shutter blades mounted for movement relative to the exposure aperture for initiating and terminating exposure. The diaphragm and shutter blades are operatively associated with a light responsive control circuit of the type having a first photocell located to receive attenuated light and a second photocell located to receive unattenuated light but being electrically trimmed with series and shunt resistors. The trimmed photocell is also coupled with, and adjustable as the focal length of a camera lens is adjusted. During formation of the exposure aperture the two photocells are series coupled; during shutter timing the trimmed photocell is removed from operation in the circuit while the attenuated photocell is coupled with a timing capacitor.

6 Claims, 6 Drawing Figures

EXPOSURE CONTROL APPARATUS

BACKGROUND OF THE INVENTION

Description of the Prior Art

One object of the many different approaches to automatic exposure control in cameras has been to achieve good picture quality with a minimum operator effort and cost. To this end, these approaches often employ exposure control systems which provide electromechanical means to regulate camera shutter speed and relative aperture to achieve a generally optimum relationship between shutter speed (picture-taking time) and depth of field. These cameras generally use a short focal length lens which minimizes the detectability of an aperture other than the optimum diaphragm setting. Also for this reason, the changing of the focal lengths in the short focal length ranges does not have a pronounced affect upon picture quality.

However, on cameras such as for example a dual lens camera having one lens mode providing a short focal length and another providing a long focal length or cameras with an adjustable, long focal length, we have noted that the overall picture quality is affected adversely if the relationship or program between depth of field and shutter speed is not changed when the lens focal length is changed. This is because at each longer focal length there is a generally optimum relationship between camera aperture and shutter speed which will provide maximum depth of field while providing a proper exposure in a time such that camera steadiness can be reliably maintained. We have found that the focal length of the lens may be varied greatly in programmed exposure cameras without noticeable degradation in picture quality, if an exposure control circit is used which has two photocell control elements, one photocell being electrically trimmed and adjustably coupled to the camera's lens adjustment mechanism, and the other being located to receive attenuated light and being series coupled to the first photocell during aperture adjustment. By improved cooperation between the aperture setting means, the control circuit, the shutter control means and lens adjusting element, our improved exposure control mechanism automatically provides for adjustment of shutter speed and exposure aperture size to provide an optimized relationship between shutter speed and depth of field as the focal length of the lens is adjusted.

SUMMARY OF THE INVENTION

Therefore, it is an object of the present invention to provide improved exposure control apparatus which automatically provides for a more optimum relationship between shutter speed and aperture size in response to adjustment of camera lens elements.

It is also an object of the present invention to provide exposure control apparatus which provides improved empirical quality in photographs.

It is another object of the present invention to provide improved automatic exposure control apparatus for variable focal length cameras which apparatus operates in accordance with a program of photographic exposure to provide a more optimum depth of field and motion stopping ability during operation at different focal lengths.

In accordance with the invention, these and other objects and advantages are attained by exposure control apparatus of the type having diaphragm means mounted for movement to form an exposure aperture, and shutter blade means mounted for movement relative to the exposure aperture for effecting initiation and termination of exposure. The diaphragm and shutter blade means are operatively associated with a light responsive control circuit which includes a first photocell having an area for receiving light that is systematically reduced in size to attenuate light impinging upon the photocell as the exposure aperture is formed, and a second photocell which is exposed to unattenuated light but electrically trimmed with series and shunt resistors. The trimmed photocell is adjustably coupled with adjustable focal length lens means. As the focal length of the lens means is varied, one of a plurality of operational characteristics is automatically adjusted to maintain a more optimum relationship between depth of field and shutter speed during exposure at that focal length. During diaphragm adjustment, the two photocells are series coupled and act jointly to establish an exposure aperture as a function of both photocells. During exposure timing the trimmed photocell is decoupled from the circuit while the attenuated photocell is coupled with a timing capacitor. Operation in this manner results in a plurality of discretely selectable operating characteristic curves or programs for the exposure control apparatus, a particular curve being continuous and selectable in response to lens adjustment.

DESCRIPTION OF THE DRAWINGS

Other objects and advantages of the invention will become apparent upon reading the following detailed description of the invention in conjunction with the following drawings in which.

DETAILED DESCRIPTION OF THE INVENTION

Because photographic cameras are well known, the present description will be directed in particular to elements forming part of, or cooperating more directly with the present invention, camera elements not specifically shown or described herein being understood to be selectable from those known in the art.

Figure 1:
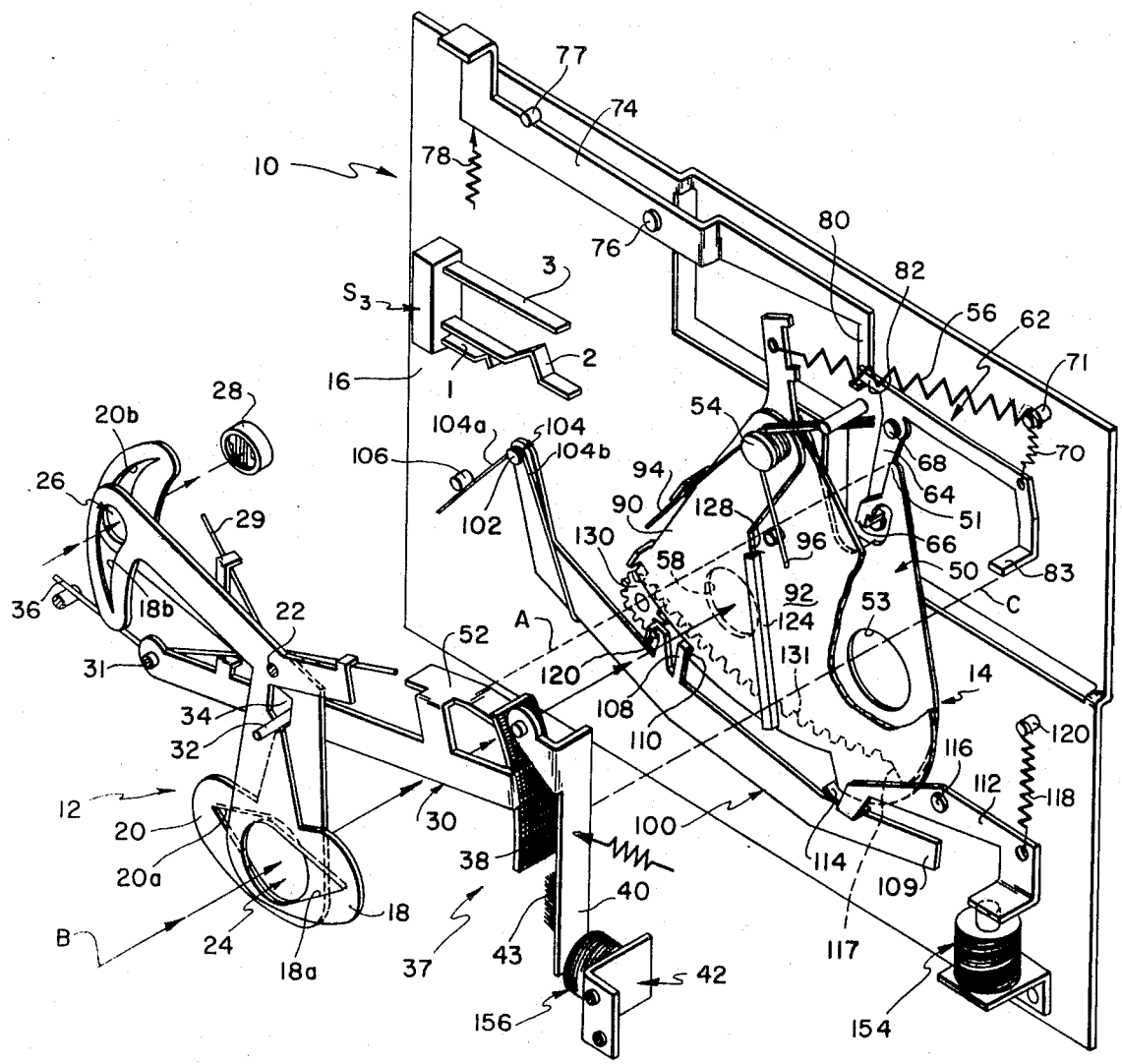
FIG. 1 is an exploded perspective view of the apparatus of the present invention showing diaphragm adjusting apparatus and shutter apparatus.

Referring to FIG. 1, there is shown exposure control apparatus 10 which includes diaphragm apparatus 12 and shutter apparatus 14. The diaphragm apparatus 12 is mounted in operative alignment with the shutter apparatus 14 by means of a mounting plate which is not shown, but which would mate with a mounting plate 16 to which the shutter apparatus 14 is mounted so that the diaphragm apparatus 12 and shutter apparatus 14 are sandwiched therebetween. The diaphragm apparatus 12, shown separated from the mounting plate 16 of FIG. 1, comprises cooperating diaphragm blades 18 and 20 which are pivotally mounted about a pin 22 and are movable to vary the relative alignment of apertures 18a, 20a and 18b, 20b to vary the size of an exposure aperture 24 and a photocell aperture 26. The diaphragm blades 18, 20 are normally biased to a full open position of the apertures 24, 26 by a leg spring 29. A photocell 28, which may be one of any number of photosensitive elements such as for example a silicon or cadmium sulfide photocells, is located behind the aperture 26 and receives light therethrough.

To effect movement of the diaphragm blades 18, 20 to vary the size of the apertures 24, 26, a control member 30 is coupled with the diaphragm blades 18, 20 by a pin 32 carried by the control member 30 and being located within a slot 34 formed by the diaphragm blades 18, 20. The control member 30 is pivotal about a mounting pin 31 in a counterclockwise direction under force of a leg spring 36 and moves the pin 32 within the slot 34 to move the diaphragm blades 18, 20 against the force of a leg spring 29. To arrest the motion of the diaphragm blades 18, 20 at one of a plurality of sizes of the apertures 24, 26, a diaphragm brake 37 of infinite ratchet capability is provided. The diaphragm brake 37 includes a foraminated element 38, such as screen wire or the like carried by the control member 30, which is movable along a path relative to selectively oriented fibers 43, carried by an armature 40, and being of material such as nylon or the like. The fibers 43 are oriented to grip the foraminated element 38 in one direction of contact but permit free movement in the other direction. The foraminated element 38 is movable along a path past the fibers 43 as the control member 30 moves to adjust the apertures 24, 26. The armature 40 is normally retained in the position of FIG. 1 by a normally energized electromagnet 42, in which position the fibers 43 are positioned out of engagement with, but in close proximity to, the foraminated element 38. Upon de-energization of the electromagnet 42, the armature 40 moves to position the fibers 43 within the path of movement of the foraminated element 38, and engagement thereof instantly stops the diaphragm apparatus 12 at selected apertures 24, 26.

Figure 2:
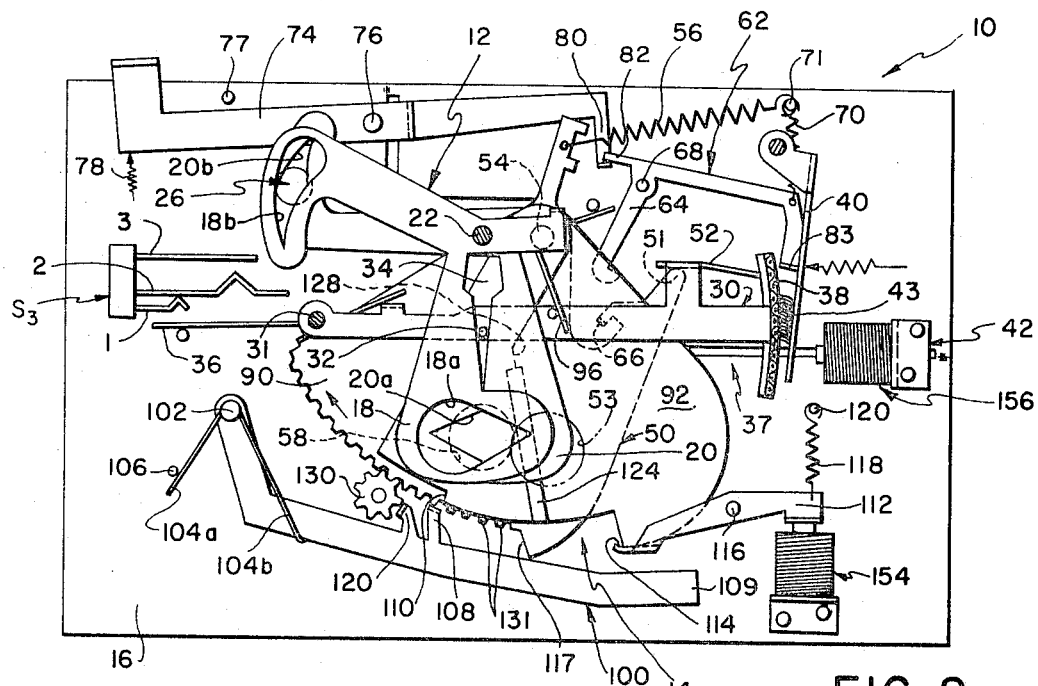
FIG. 2 is a front elevation view of the apparatus of FIG. 1 in which the diaphragm has been set.
Figure 3:
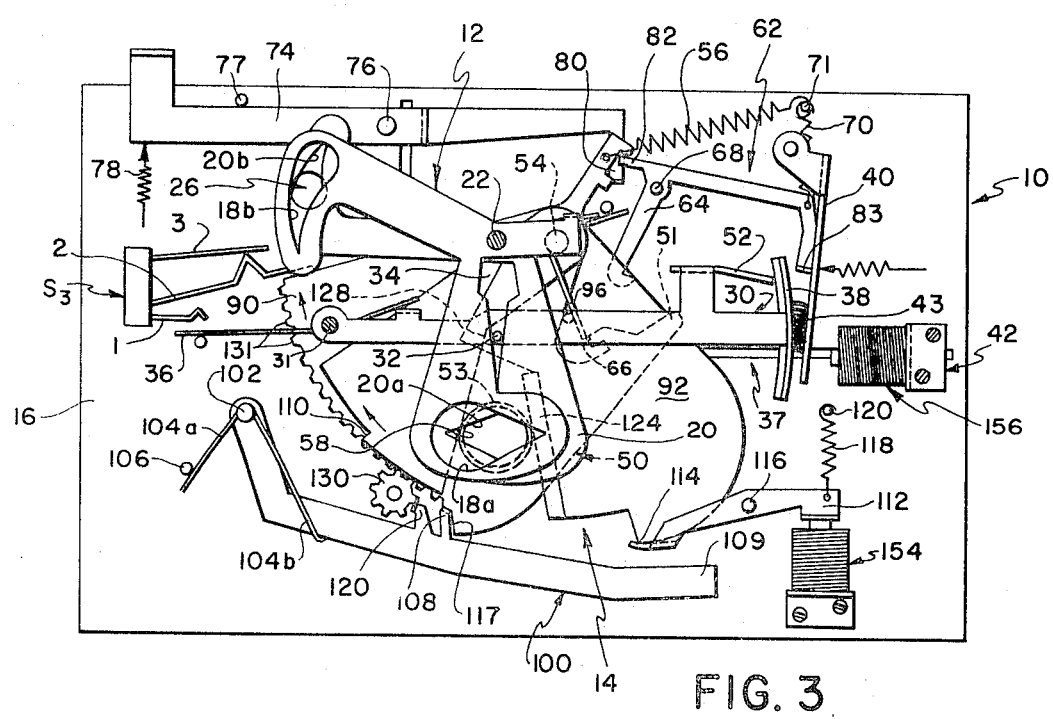
FIG. 3 is a front elevation view of the apparatus of FIG. 2 showing the diaphragm apparatus removed and the shutter apparatus having a first blade moved into an open position of an exposure aperture.
Figure 4:
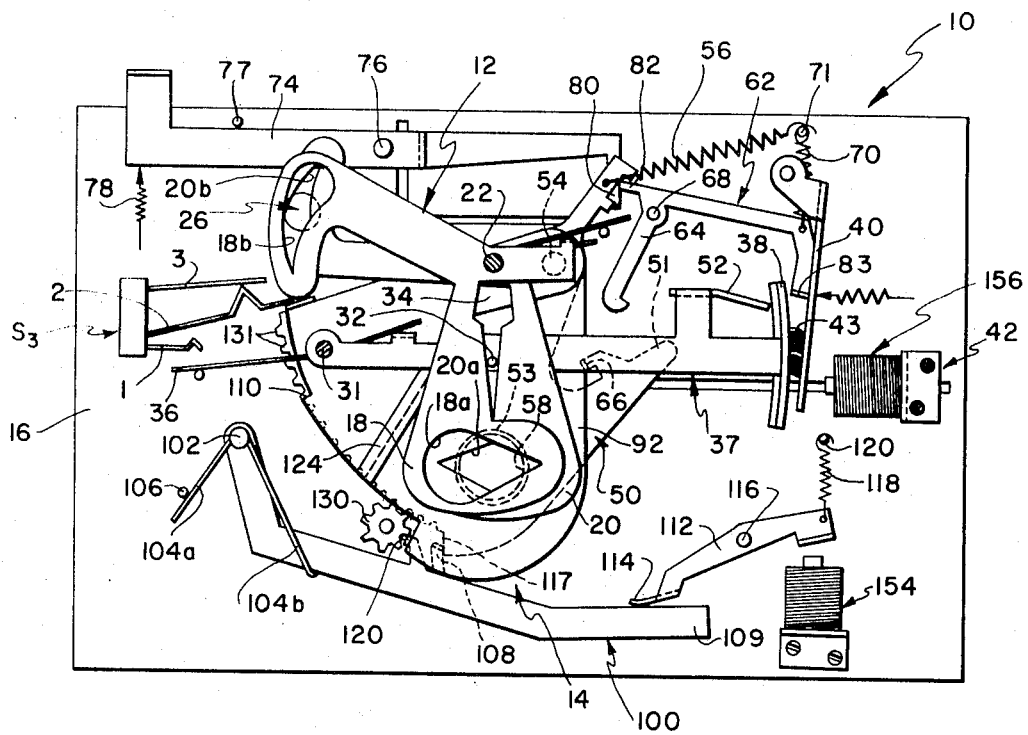
FIG. 4 is a front elevation view of the apparatus of FIG. 3 showing the shutter apparatus with a second blade moved to close the exposure aperture to terminate an exposure.

Control of the movement of the diaphragm apparatus 12 to establish the apertures 24, 26, and the sequence of operation of the shutter apparatus 14 is effected by a master member 50 which, as indicated by dotted line A of FIG. 1 and more clearly shown in FIG. 2, 1) regulates initial movement of the control member 30 by engagement of a tip 51 of the master member 50 and a flange 52 of the control member 30, and 2) permits the release of the shutter apparatus 14 in a manner to be described later. The master member 50 comprises a blade member mounted on the mounting plate 16 at a post 54 to be pivotal in a clockwise direction under the bias of a tension spring 56. Such clockwise movement, as shown in FIG. 3, moves the tip 51, which is configured to move along the flange 52, to permit the control member 30 to pivot and thus the diaphragm apparatus 12 to follow its movement. At the end of movement of the master member 50, an aperture 53, defined in the master member 50, moves into alignment with an aperture 58 formed in the mounting plate 16. An exposure aperture is thus formed which is also aligned with the aperture 24 and with photographic axis B.

To retain the master member 50 in the cocked position of FIG. 1, a latch 62 is provided, which includes a depending element 64 disposed to engage and latch the master member 50 at a tab 66. The latch 62, which is mounted in a recessed portion of the mounting plate 16 at pin 68, is disposed for pivotal movement in a clockwise direction, against the force of a tension spring 70, in which direction of movement the depending element 64 releases the tab 66. To pivot the latch 62 and release the depending element 64 from the tab 66, a camera release 74 is provided, being pivotally mounted to the plate 16 at a pin 76. The camera release is retained in the position of FIG. 1 against the force of a spring 78 by means of a post 77, and in such position a finger 80 thereon engages an extension 82 of the latch 62, and thus retains the latch 62 in the position of FIG 1. A reset tab 83 is part of and extends perpendicular to the latch 62 and, as shown by the dotted line C, engages the armature 40 to reset the armature 40 against the electromagnet 42 when the latch 62 moves to latch the master member 50 in the position of FIG. 1.

To open and close the exposure aperture, the shutter apparatus 14 includes opening and closing shutter blades 90 and 92 respectively, both being pivotally mounted about the post 54 and biased for clockwise movement by leg springs 94 and 96 respectively. A shutter control lever 100, mounted to the mounting plate 16 at pin 102, cooperates with the master member 50 to functionally control release of the opening shutter blade 90 and to stop the closing movement of the closing shutter blade 92. A leg spring 104, having a leg 104a engaging a pin 106 on the mounting plate 16 and a second leg 104b engaging an underside of the shutter control lever 100, urges the shutter control lever 100 in the position of FIG. 1. In the cocked position of the control lever 100, an upright member 108 engages a lip 110 of the opening blade 90 to retain the opening blade 90 in a position in which an opaque portion thereof covers the aperture 58. In the uncocked position of the shutter control lever 100, effected by engagement of a tip 117 of the master member 50 during movement thereof, the shutter blade 90 is released and an upright member 120 is positioned in the path of movement of the closing blade 92 for stopping the closing blade 92 at the end of its movement. An extension 109, of the control lever 100, engages an armature 112 at armature slide 114 to position the armature 112 to engage an electromagnet 119 so that the closing blade 92 is held in the open position. A spring 118, under tension by one end being coupled to the armature 112 and its other end connected to a pin 122 on the mounting plate 16, biases the armature 112 in a counterclockwise direction about a mounting pin 116, against the force of the shutter control lever 100, and, if energized, against the force of the electromagnet 119. An offset surface 124, on a leading edge of the closing blade 92, engages a trailing edge 128, of the opening blade 90, to aid the armature 112 in retaining the closing blade 92 in position of FIG. 1.

A spur gear 130 engages a toothed lower portion 131 of the master member 50 in a gear ratio which provides for a preselected delay in movement of the master member 50 to permit the diaphragm apparatus 12 to be set, and to permit an electromagnet 119 to become energized after the camera is actuated during a low light intensity exposure, as will be later explained in the discussion of the control circuitry for the electromagnet 119 and the discussion of the operation thereof.

Figure 5:
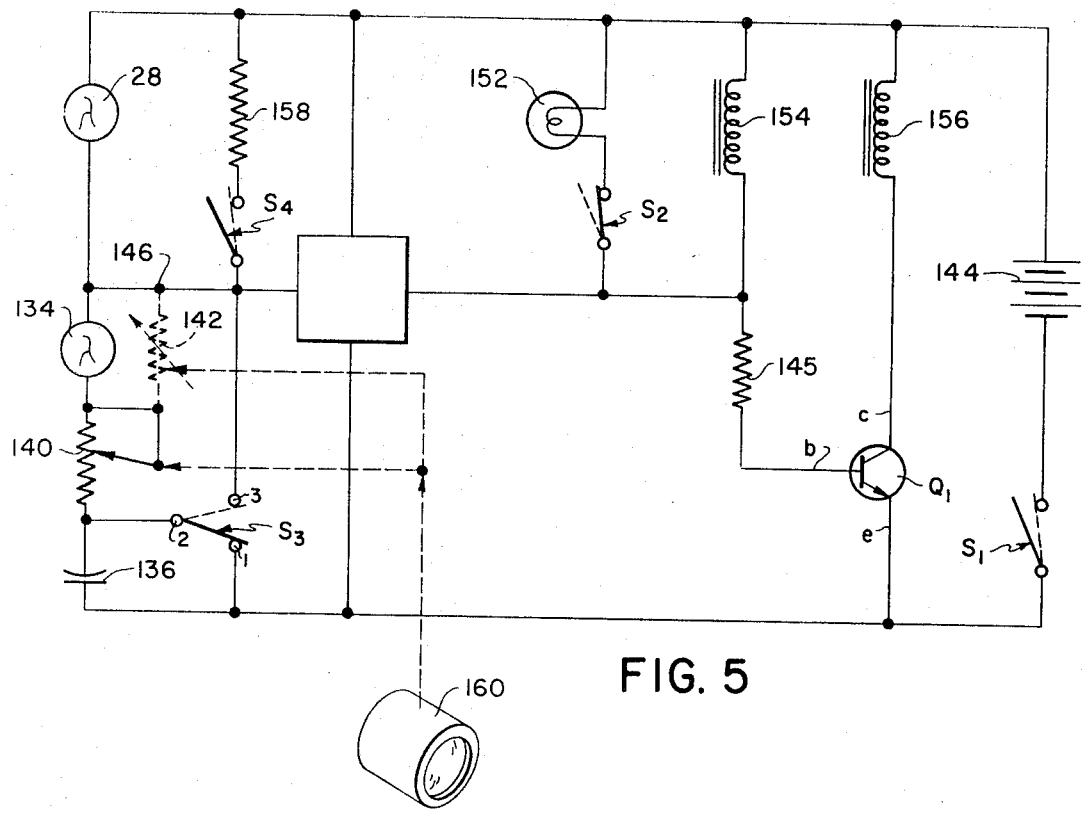
FIG. 5 is a schematic diagram of a circuit suitable for use with the apparatus of FIG. 1 and showing a lens element coupled with the circuit.

A control circuit, for use with the preferred construction of the apparatus is shown in FIG. 5. The circuit includes the first photocell 28, and also includes a second photocell 134 (not shown in FIGS. 1–4) which is series-parallel trimmed by variable resistors 140 and 142 respectively. The photocell 134 may be located on the camera to receive unattenuated light and may be coupled in series circuit with the photocell 28 and a battery 144 by means of an on-off switch $S_1$ and low light-timing switch $S_3$. The photocell 134 is series coupled with the photocell 28 when switch contacts 1, 2 of switch $S_3$ are connected. Also, when switch contacts 1, 2 are connected, a junction 146 between the photocells 28, 134 is coupled to an input of a threshold circuit 150. The threshold circuit 150 may be one of a variety of voltage or current sensitive threshold circuits which are commercially available, the Schmitt Trigger being one such circuit. The junction 146 provides an input to trigger the threshold circuit 150 between an "on" and an "off" state, the on state being a state in which the output of the threshold circuit 150 supplies current to other circuit elements. The output of the threshold circuit 150 is directly coupled through a switch $S_2$ to a low light indicator 152, to coils 154 of electromagnet 119, and indirectly coupled through a transistor $Q_1$ to coils 156 of electromagnet 42. The coils 154, which are coupled to the battery 144 and to the base b of transistor $Q_1$ by resistor 145, energize the electromagnet 119 when the output of the threshold circuit 150 is on or "low" and current flows through the coils 154. The coils 156, which are coupled in the collector c of the transistor $Q_1$ and to the battery 144, energize the electromagnet 42 when the transistor $Q_1$ is conducting. The base b of the transistor $Q_1$ is coupled to the threshold circuit 150 in a manner such that when the threshold circuit 150 is in a low state, the base b of the transistor $Q_1$ is grounded through the threshold circuit 150. When the base b of the transistor $Q_1$ is grounded, the transistor $Q_1$ is not in a conductive state, and the electromagnet 42 will not become energized. The low-light timing switch $S_3$ is a make-before-break switch including the elements 1, 2 and 3, the switch $S_3$ being coupled between a capacitor 136 and the photocell 134 in a manner to first connect the junction 146 between the photocells 28, 134 to the input of the threshold circuit 150 during low light test, and second to connect the junction 146 between photocell 28 and capacitor 136 to the input of the threshold circuit 150. In the position of the switch $S_3$ as shown by the solid lines of FIG. 5, the normal position, the circuit performs the low-light test through the voltage divider provided by the photocells 28, 134 and the resistors 140, 142. When the switch $S_3$ is in the position shown in FIG. 5, the capacitor 136 is normally at ground potential. When the switch $S_3$ is moved to its other position, i.e. when the contacts 2 and 3 are connected as shown by the dotted lines, by movement of the master member 50 or possibly by the opening shutter blade 90, the junction 146 between photocell 28 and capacitor 136 is coupled to the input of the threshold circuit 150 and will cause the output of the threshold circuit 150 to go "high" when the potential on the capacitor 136 reaches a value of approximately .6 times the voltage of the battery 144. The time required for the charge on the capacitor 136 to reach .6 times the voltage of the battery 144 is governed by the value of the resistance of the photocell 28 and the capacitance of the capacitor 136. A switch $S_4$ is responsive to be closed upon receiving a flashlamp unit to the camera, and couples a resistor 158 in parallel with the photocell 28 to establish a voltage at the junction 146 after a time which is primarily related to the value of a resistor 158 and the capacitance of the capacitor 136.

In keeping with the principal objects of the invention, the circuit of FIG. 5 is mechanically coupled, by conventional means not shown but indicated by the dotted lines of FIG. 5, with an adjustable focal length lens element 160. The lens element 160 may be two or more individual lens elements that are interchangeable or a single element which has adjustable focal length, such type lens not being critical to the invention.

Figure 6:
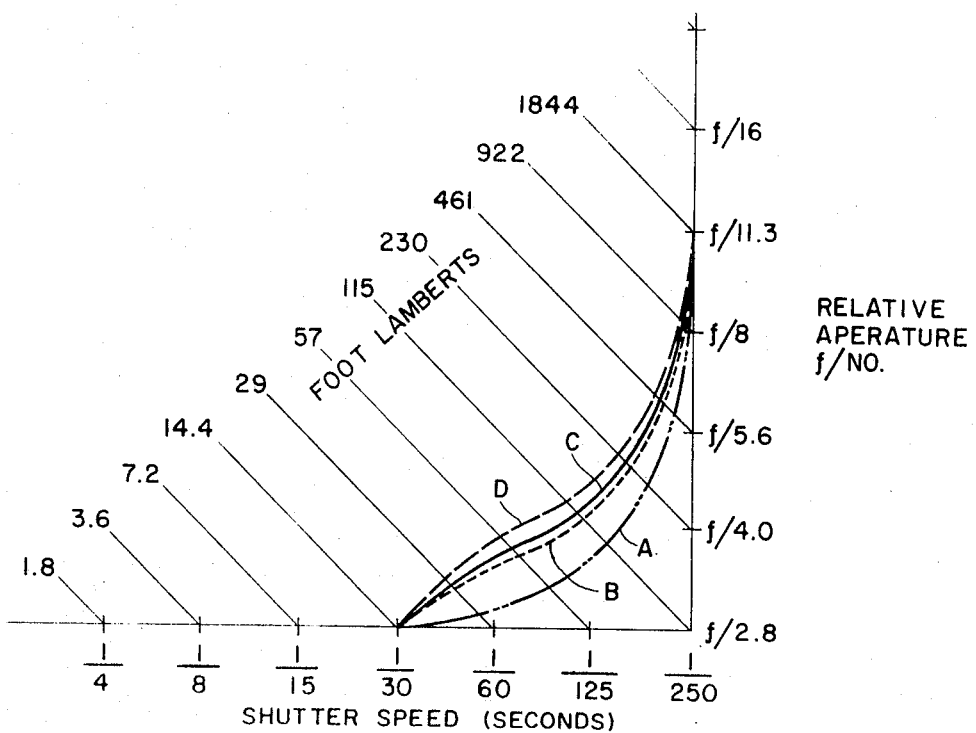
FIG. 6 is a time-aperture and light intensity diagram of a set of characteristic program under which the apparatus of FIG. 1 is operable when using the circuit of FIG. 5.

The adjustment of the "effective" value of the resistance of the unattenuated photocell 134 is attained by adjustment of the lens element 160 through the coupling which also adjusts the value of shunt and trim resistors 140, 142. FIG. 6 is a frequently used diagram which shows operating characteristic curves which relate exposure aperture size, exposure time and light intensity and which may be attained by the apparatus of this invention. In the diagram shown, the light intensity is given in foot lamberts for film speed such as ASA 64 and a maximum exposure aperture of $f/2.8$. The curves A–D result from trimming the photocell 134 to be used in conjunction with the photocell 28 to establish an aperture 26, and later using the photocell 28 with the capacitor 136 to establish shutter speed. In addition to the advantage of selecting the degree of "rounding" of the characteristic curve, this invention simplifies the mechanical execution of the design. The attenuation of photocell 28 has the same range as the aperture 24 and is usually in a tracking mode. Therefore, no bias or discontinuity in tracking is required with possible response time errors by changing the photocell 28 from an aperture setting mode to a shutter timing mode.

To describe the operation of the apparatus, reference is first made to FIG. 5 in which the lens elements 160 is adjusted to selected a desired lens focal length. In turn the resistors 140, 142 are adjusted for providing proper shunt to the photocell 134 such that total circuit apparatus operation is along one of the characteristic curves A–D of FIG. 6. Now turning to FIGS. 1 and 5, the camera release 74 is depressed which closes the main switch $S_1$ and supplies power from the battery 144 to the threshold circuit 150. The switch $S_3$ is in the position in which the elements 1 and 2 are connected, and the output of the threshold circuit 150 depends upon the voltage established at the junction 146 by the divider formed by photocells 28, 134. If the scene brightness (ambient lighting) is below a preselected level, the voltage at the junction 146 will be below the low-light, signal threshold of the threshold circuit 150 and the output of the threshold circuit 150 will be "low"; the low light lamp 152 will become lighted and electromagnet 119 will become energized. The base of transistor $Q_1$ will become grounded through the threshold circuit 150 and the transistor $Q_1$ will not conduct, therefore, no current will flow through coils 156 and the electromagnet 42 will not be energized. The armature 40 will be released from the electromagnet 42 and the selectively oriented fibers 43 will engage the foraminated element 38 to lock the diaphragm 12 in a full open position. If, however, upon closure of the switch $S_1$, the scene brightness is above the level at which an indication of low-light intensity is given, the voltage at the input of the threshold circuit 150 will be above or equal to threshold voltage required to change the state of the threshold circuit 150. The output of the threshold circuit 150 will go high and the base b of the transistor $Q_1$ receives bias via the resistor 145 and is thus in a conductive state; the electromagnet 42 becomes energized and the electromagnet 119 will become de-energized. When the camera release 74 is further depressed to bring the tab 80 into contact with the extension 82 the latch 62 is pivoted about the pin 68 to release the depending elements 64 from the tab 66 of the master member 50. The master member 50 pivots in a clockwise direction, being controlled in its movement by engagement of the spur gear 130 with the mating gear teeth 131, and the tip 51 moves along flange 52. The control member 30 pivots clockwise under the bias of the leg spring 36 and the size of the apertures 24 and 26 begins to decrease. As the size of the aperture 26 is reduced, the amount of light incident onto the photocell 28 is reduced and thus its resistance increases. The first motion of the control member 30 also opens the switch $S_2$ (not shown) to prevent the low-light lamp 152 from lighting when the threshold circuit 150 changes state. The switch $S_2$ may be eliminated, and the low-light lamp 152 may then be used as an end of exposure indicator since removal of the switch $S_2$ would make the lamp 52 parallel with the coils 154. As may best be seen in FIG. 2, the master member 50 engages an upper surface of the control lever 100 during its movement from the position of FIG. 1 to the position of FIG. 3. The engagement of the master member 50 with the control lever 100 pivots control lever 100 counterclockwise about the pin 102, against the bias of the leg spring 104, and releases the upright 108 from the blade 90. The blade 90 therefore is free to move to the open position as shown in FIG. 3. At the end of the movement of the master member 50, the apertures 53, 58 are aligned with the aperture 24 and the master member 50 engages the switch $S_3$, moving it to bring contact 2 into engagement with contact 1 to thereby start the timing cycle. The switch $S_3$ being a make-before-break switch controls the input to the threshold circuit 150 in a manner such that the input to the threshold circuit 150 is always coupled to either the voltage divider network comprising the photocells 28, 134 or the RC network comprising the photocell 28 and the capacitor 136. There is no position during the switching of $S_3$ in which the input to the threshold circuit 150 is allowed to "float". The rundown of the master member 50 allows approximately 10 milliseconds after the threshold circuit 150 is energized to allow the flux in the electromagnet 119 to build up before the opening blade 90 is released to open. After a time interval which is related to the resistance or conductivity of the photocell 28 and the capacitance of the capacitor 136, the voltage level at junction 146 reaches a value of .6 times the voltage of the battery 144 and the threshold circuit 150 is caused to change its conductive state. Upon the change in conductive state of the threshold circuit 150, the electromagnet becomes de-energized and the armature 112 is released. The armature 112 pivots counterclockwise about the pin 116 under the force of the spring 110 and the blade 92 is released to move to close the apertures 53, 58. A second upright element 160 of the control lever 100 is located to engage and the closing shutter blade 90 after its movement to close the aperture pair 53, 58.

Operation of the apparatus during exposure when a flashlamp unit is received to the camera is similar to the previously described operation with the single exception that the switch $S_4$ is closed, by means well known in the art, and the junction 146 reaches the threshold potential of the threshold circuit 150 after a preset time. This preset time generally is in the order of 33 to 50 milliseconds after start of the timing, and may be adjustable with flash duration as desired simply by making the resistor 158 variable.

The invention has been described in detail with particular reference to a preferred embodiment thereof, but it will be understood that variations and modifications can be effected within the spirit and scope of the invention.

We claim:

1. In a camera of the type having adjustable diaphragm and shutter means, lens means which is selectively adjustable to one of a plurality of focal lengths and light responsive means for automatically controlling said diaphragm and shutter means to effect a photographic exposure according to a predetermined program, the improvement comprising:
   adjustable program control means, operatively associated with said diaphragm and shutter means, for varying said predetermined program of photographic exposure; and
   means, operatively associated with said lens means and said program control means, for adjusting said program control means in response to adjustment of said lens means so as to provide a more optimum relationship between shutter speed and depth of field for a focal length selected for said lens means.

2. In a camera having lens means of variably selectable focal length and diaphragm and shutter apparatus adapted to be adjustable in accordance with the level of scene illumination intensity, apparatus to provide a balanced relationship between shutter speed and depth of field, comprising:
   light responsive circuit means, operatively associated with said diaphragm and shutter apparatus and including photosensitive means located to be exposed to scene illumination and having a parameter of predetermined variation with the level of illumination intensity impinging thereon, for adjusting said diaphragm to form an aperture size and for actuating said shutter to operate at a shutter speed in accordance with the value of said parameter over a range of illumination intensity;
   variable resistance means, electrically coupled with said photosensitive means so that variations thereof establish selectable predetermined variations of said parameter variations with illumination intensity, for establishing multiply selectable relationships between the size of said aperture, said shutter speed and the level of illumination intensity; and
   means, coupling said lens means and said resistance means, for varying the value of said resistance means when said focal length of said lens means is varied.

3. In a camera having lens means of selectably variable focal length and diaphragm and shutter means which are automatically adjustable in accordance with the level of scene illumination intensity, apparatus for automatically providing an improved relationship between shutter speed and depth of field for different selected focal lengths comprising:

light responsive circuit means, operatively associated with said diaphragm and shutter means and including first and second photosensitive elements each having a parameter which varies with the intensity of illumination impinging thereon, for first adjusting said diaphragm means to form an exposure aperture in accordance with the value of said parameters and for actuating said shutter apparatus to operate to establish a shutter speed in accordance with the value of at least one of said parameters;

attenuation means, cooperating with said diaphragm apparatus, for varying the amount of light received by said first photosensitive element in response to adjustment of said diaphragm apparatus;

variable resistance means electrically coupled with said second photosensitive element, for affecting the parameter value thereof; and adjustment means, coupling said resistance means with said lens means, for varying said resistance means in response to variation of the focal length of said lens means.

4. Apparatus as claimed in claim 3 in which said variable resistance means is series and shunt coupled with said second photosensitive element.

5. Apparatus as claimed in claim 3 including means for coupling said first and second photosensitive element during adjustment of said diaphragm means.

6. Apparatus as claimed in claim 5 wherein said means for coupling said first and second photosensitive means also electrically decouples said second photosensitive means from said light responsive circuit means when said apparatus provides shutter timing.

* * * * *